3,600,169

PHOTOCHEMICAL ELECTROSTATIC COPYING SHEET AND PROCESS USING FREE RADICALS

William R. Lawton, Salem, N.H., assignor to Bard Laboratories, Inc., Amherst, N.H.

No Drawing. Filed Nov. 25, 1966, Ser. No. 596,814
Int. Cl. G03g 5/02
U.S. Cl. 96—1.5 7 Claims

ABSTRACT OF THE DISCLOSURE

An electrostatic light sensitive reproduction sheet employing a composition comprising in an insulating resinous binder an organic stable free radical and a precursor sensitive to light to be converted to transient free radicals reactive with the stable free radical to change the conductance of the sheet so that an electrostatic image can be formed.

This invention is concerned with light-sensitive copy systems. It is related particularly to a photoelectrosensitive imaging process.

One objective is the development of a reproductive system which is sensitive to infra-red, visible, and ultraviolet radiation.

A second objective is the development of improved unpigmented light weight photoelectrosensitive papers, as compared to the presently available relatively heavy pigmented electrofax papers.

A third objective is the development of organic photoconductive systems with substantially increased light sensitivity over presently known systems of this type.

A further objective is the production of photoconductive imaging processes wherein the latent (i.e. after exposure to light but before developing with a toner) imaged area does not disappear on ageing or upon being stored in the dark.

Another objective is the development of photoelectroconductive papers which possess greater stability over a wide range of humidity conditions as compared to presently known papers of this type.

A further objective is the production of copy papers which are sufficiently transparent to ultraviolet to be used as masters for diazo reproduction processes.

A still further objective of this invention is the production of transparent masters for projection.

Still another objective is the development of conductive latent image areas which can be charged repeatedly without image loss.

An additional objective is the production of either positive or negative images by photoelectrochemical means.

There are a number of known photoelectrosensitive systems. (1) Xerography generally refers to copying by means of a photosemiconductor such as selenium. (2) The commercial "Electrofax" process depends on the use of photosemiconductors such as zinc oxide coated on a paper web. (3) Persistent internal polarization (PIP process) depends on the use of photosemiconducting phosphors such as ZnS.CdS.

Organic photosemiconductors are also being evaluated in these types of copying processes. The zinc oxide and phosphor systems must be applied as pigmented coatings and the resulting sheets are cumbersomely heavy and opaque. The organic photosemiconducting system is also pigmented, opaque, and has a relatively slow spectral response.

Thermoconductive copy systems have been disclosed which can produce copies by imaging a charged plastic coated sheet on a "Thermofax" type infra-red copier, (i.e. using heat rather than light to render the heat struck areas conductive and thereby provide a latent image) then developing the imaged area with an electrostatic toner. These systems are color blind and require heat absorbing masters to form an image.

Halogenated hydrocarbons (U.S. Pat. No. 3,081,165) and diazo compounds (J. Phot. Sci. vol. 10, page 57 (1962)) have been incorporated in resin coatings and latent images have been produced by exposure to ultraviolet, electrostatically charging the imaged sheets, and developing the imaged areas by electrostatic toners. The conductive areas are produced by the photo formation of transient free radicals, i.e. the organic compound is sensitive to light to form transient free radicals at the light struck areas which upon subsequent charging render such areas electro conductive so that only the non-light struck areas pick up the charge. Such systems are slow and require ultraviolet light to produce satisfactory copies. In addition, the free radicals formed will disappear after a period of time so that the charging and developing steps must follow soon after exposure. The halogenated hydrocarbon precursors (i.e. having the property of forming transient free radicals on exposure to light) are highly volatile and consequently have low shelf stability due to loss of imaging capability, i.e. due to volatilization.

This invention is based on the development of differential areas of conductivity in a plastic coating by photochemical means, i.e., when exposed to light one or more new relatively stable chemical compositions is formed in the light struck areas, which composition has a different conductivity than the non-light struck areas. The plastic coating is then electrostatically charged and the image is developed by electrostatic toners. The chemical latent image is permanent unless further exposed to light and can be charged repeatedly without loss of image. The photoelectrochemical system can be made sensitive to visible, ultraviolet, or infra-red. The conductive areas can be induced either in the light exposed or non-exposed areas, i.e. the new compositions formed in response to light can be either more conductive or less conductive then the non-light struck areas.

This is achieved by the use of free-radical photochemical reactions. Transient free radicals are generated with light from precursor compounds which are sensitive to light to form such transient free radicals, and these transient free radicals, in turn, react with other materials in the coating to change its conductivity in the light struck areas and thereby allow electrostatic charging and toner development of the image. Since the latent image is a stable chemical one in nature, it is permanent until exposed further to light. Sensitizers can be used which increase the spectral sensitivity of the total system.

The other materials with which the transient free radicals react as aforesaid in accordance with the present invention are selected from the group consisting of organic stable free radicals, quinones and anthrones and such materials together with the precursor are contained in an inert plastic matrix binder having a relatively high electrical resistance to current flow not substantially less than $10^9$ ohms per square, i.e. per square unit area, e.g. per square inch, preferably not less than $10^{10}$ to $10^{15}$ ohms per square. These stable free radicals are described as a class on pages 514 to 520 of "Organic Chemistry," 2nd ed., 1964, by Cram & Hammond published by McGraw–Hill Book Company and in the book "Stable Radicals" by Anatolii Leonidovich Buchachenko published by Consultants Bureau, New York in 1965. They are also described as a class in C & EN, Oct. 3, 1966, pages 102 and 103. They may be defined as free radicals which are sufficiently stable to be isolated, stored and handled as such.

The term "transient free radical" is also described as a class in "Organic Chemistry," 2nd ed., 1964 by Cram & Hammond published by McGraw-Hill Book Company on pages 516–517. They may be defined as short-lived free radicals which cannot be isolated or stored.

Promoters for the generation and reaction of the transient free radicals may be used.

I have discovered that quinones and anthrones, with or without a promoter, when exposed to light and to the aforesaid stable free radicals, rapidly discolorize the stable free radicals, which indicates the formation from the quinone and anthrone of transient free radicals by exposure to light, which transient free radicals react with the stable free radicals to form new compounds. Stable free radicals are effective scavengers for transient free radicals of this type.

It is believed that quinones when exposed to light as aforesaid, form a highly reactive type of transient free radical semiquinone. When various quinones were incorporated in plastic coatings with relatively high dielectrics, it was discovered that light caused the exposed areas to become less conductive than the non-exposed areas and a negative image could be obtained by electrostatically charging the sheet and developing the image with commercial electrostatic toners. Similarly, negative images were obtained when the phototropic compounds, such as anthrone and bianthrone, were substituted for the quinones. It is believed that the quinone or anthrone when exposed to light, forms transient free radicals which react with remaining quinone or anthrone to form a stable compound having a different conductivity than the original quinone or anthrone. It was further discovered that by adding other light sensitive free radical precursors and/or stable organic free radicals, the areas which are exposed to light can be made more conductive than the non-light struck areas and subsequent electrostatic charging and toner developing will produce a positive copy.

Where the added compound was a stable free radical, it is believed that the transient free radicals, formed by the quinone or anthrone when exposed to light, reacted with the stable free radical to form a compound having a different conductivity than either the quinone or anthrone or the stable free radical or the mixture of both in the plastic. Where the added compound was another transient free radical precursor it is believed that the transient free radicals generated by such other precursor by exposure to light reacted either with the quinone or anthrone or transient free radicals generated by them by exposure to light to form compounds having a different conductivity than either the other precursor, the quinone or anthrone or the mixture thereof in the plastic.

Examples of the quinones and anthrones which can be used in accordance with this invention to form negative electrophotochemical images are: 1,2 - naphthoquine, 2,6-dichloro-p-benzoquinone, 2,3 - dichloro - 1,4-naphthoquinone, 2,5 - dichloro-p-benzoquinone, 1,2 - naphthoquinone, 2,5 - di-t.butyl-p-benzoquinone, 2-methyl - 1,4 - naphthoquinone, methyl-p-benzoquinone, 2,5-dimethyl-p-benzoquinone, phenanthrenequinone, anthrone, and bianthrone.

By a free radical we mean a fragment of a molecule which has a unpaired electron. A free radical has a high chemical reactivity which is connected with the tendency to compensate the spin of the free electron as well as the specific magnetic properties which are connected with this spin. Consequently, most free radicals are highly unstable and have a transitory existence. However, this invention relates to a known class of colored stable free radicals which are stable because the unpaired electron is shielded by a bulky molecule configuration to thereby provide steric hindrance. However, the present invention takes advantage of the fact that when these stable free radicals are exposed to highly reactive transient free radicals they react quite readily since the transient free radicals are small enough to reach the unpaired electron of the stable free radical. Thus, in this invention, we take advantage of this chemical reactivity by trapping the transient free radicals, generated with light, with the highly colored stable free radical. The two free radical species interact to form one or more new components having a different conductivity from the original materials. The light generated free radical species exists only for a fraction of a second to a few seconds. The stable free radicals, on the other hand, exist for long periods of time and their life time can be measured in years.

There are a considerable number of stable free radicals known at present, all of which are colored and all of which can be used in the present invention. However, preferred classes of stable free radicals are (1) the organic hydrazyls, in which the unpaired electron is on the nitrogen, (2) the organic verdazyls in which the unpaired electron is again on the nitrogen, (3) pyridinyl compounds, such as 1-ethyl-4-carbomethoxypyridinyl, in which the unpaired electron is again on the nitrogen, (4) the organic nitroxides, in which the unpaired electron is on the oxygen, (5) the organic aroxyls, in which the unpaired electron is also on the oxygen, (6) the carbon free radicals in which the unpaired electron is on the carbon atom, particularly aryl alkyls and aryl cycloalkyls in which the unpaired electron is on a carbon atom in the alkyl or cycloalkyl group and (7) ionic free radicals, particularly (a) Wurster's radicals (see C & E News, Oct. 3, 1966, pages 102–103), (b) Weitz's radicals (see C & E News, Oct. 3, 1966, pages 102–103), (c) semiquinones, (d) salts, such as amino phospheno, arseno, caesium, etc., of tetracyanoquinonedimethane, dicyanoquinonedimethane, tetracyanonaphthoquinonedimethane and dicyanonaphthoquinonedimethane, unsubstituted and substituted by halogens and nitro groups in the aromatic ring, (e) polynuclear aromatic and heterocyclic compounds reacted with an alkali metal to form an ion radical, these reactions being well known ones, (f) polynuclear aromatic and heterocyclic chlorates, (g) unsubstituted and N alkyl substituted carbazole-$C_7H_7^+BF_4^-$, (h) the triaryl nitrogen free radicals, such as the free radical ions of triaryl amines, e.g. the radical ion from tri-p-dimethylaminophenyl amine, and (i) hydrazinylium free radical ions, such as that formed by oxidizing polyaryl hydrazines, e.g. tetraphenylhydrazine, with the Gomberg reagent (silver perchlorate and iodine) (see C & E News, Oct. 3, 1966, pages 102–103). Whereas the aforesaid classes 1 to 6 are non ionic, class 7 is ionic.

One of the most useful classes of colored stable free radicals are the hydrazyls and related nitrogen free radicals including the verdazyls and the pyridinyls. They can be readily prepared in a known manner and require only a very small amount to provide the advantages of the present invention. They act as efficient free radical scavengers, i.e. for the transient free radicals released from the precursors by light. Representative stable free radicals of this class useful in the invention are included in the following list.

HYDRAZYLS

α-p-fluorophenyl-α-phenyl-β-picrylhydrazyl
α-p-chlorophenyl-α-phenyl-β-picrylhydrazyl
α-p-bromophenyl-α-phenyl-β-picrylhydrazyl
α-phenyl-α-biphenyl-β-picrylhydrazyl
α-(p-chlorobiphenyl)-α-phenyl-β-picrylhydrazyl
α-(p-bromobiphenyl)-α-phenyl-β-picrylhydrazyl
α,α-diphenyl-β-2,6-dinitrophenylhydrazyl
α-phenyl-α-fluorenyl-β-picrylhydrazyl
α-(4-methoxyphenyl)-α-phenyl-β-picrylhydrazyl
α-(4-methoxybiphenyl)-α-phenyl-β-picrylhydrazyl
α,α-diphenyl-β-2,6-dinitro-4-sulfophenylhydrazyl
potassium salt α,α-diphenyl-β-2,6-dinitro-4-sulfophenylhydrazyl
α,α-diphenyl-β-2,6-dinitro-4-carboxyphenylhydrazyl
sodium salt α,α-diphenyl-β-2,6-dinitro-4-carboxyphenylhydrazyl
α-(α-naphthyl)-α-phenyl-β-picrylhydrazyl
α-(β-naphthyl)-α-phenyl-β-picrylhydrazyl
α,α-diphenyl-β-(2,4,6-trinitro-3-methylphenyl) hydrazyl α-(α-naphthyl)-α-phenyl-β-(2,4,6-trinitro-3-methoxyphenyl)hydrazyl
α,α-diphenyl-β-picrylhydrazyl
potassium salt α,α-diphenyl-β-(2,4-dinitro-6-sulfophenyl) hydrazyl
α,α-diphenyl-β-(2-6-dinitro-4-bromophenyl)hydrazyl
2,2-bis(p-nitrophenyl)-1-picrylhydrazyl
N,N'[bis(α-(2-benzothiazolyl)-α-phenyl-β-3-picryl) hydrazinyl]piperazine
α-(N-methylbenzimidazol-2-yl)-α-phenyl-β-picrylhydrazyl
α,α-di(p-tolyl)-β-picrylhydrazyl
α,α-diphenyl-β-(2,4,6-trinitro-3-chlorophenyl)hydrazyl
α,α-2-diphenyl-β-(2,4,6-trinitro-3-piperidinophenyl) hydrazyl
α,α-diphenyl-β-(2,4,6-trinitro-3-morphdinophenyl) hydrazyl
α,α-diphenyl-β-(2,4,6-trinitro-3-methoxyphenyl)hydrazyl

VERDAZYLS (See Monatsh. Chem. 97 (2) 517–24 (1966) also Chem. Abstracts 65–12277F; 60–11922g; 61–5624C; 62–7760F, Angew. Chem. 76 (15), 691 (1964).

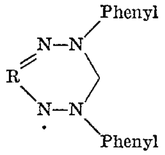

where R is a sugar radical such as p-galacto-pentaacetoxy pentyl, D-mannopentaacetoxypentyl, D-galacto-pentahydroxy pentyl.

PYRIDINYLS 1-ethyl-4-carbomethoxypyridinyl

A second class which contains many very stable free radicals ranging in color from yellow to purple is the nitroxides. Many of these can be chemically modified and have their physical properties changed without influencing the stable free radical character. Representative compounds of this class useful in the invention are as follows:

NITROXIDES 2,2,6,6-tetramethyl-N-dehydropiperidine-4-one-1-oxide
2,2,6,6-tetramethyl-N-dehydropiperidine-4-one-1-oxide hydrazide
2,2,6,6-tetramethyl-N-dehydropiperidine-4-one-1-oxide oxime
2,2,6,6-tetramethyl-N-dehydropiperidine-4-one-1-oxide semicarbazone
2,2,6,6-tetramethyl-N-dehydropiperidine-4-one-1-oxide 2,4-dinitrophenyl hydrazone
2,2,6,6-tetramethylpentamethylene nitroxide
2,2,6,6-tetramethyl-4-ethyl-4-piperidinolnitrogen oxide
2,2,7,7-tetramethyl-5-homopiperazinonenitroxide
2,2,6,6-tetramethyl-4-hydroxy-1-piperidin-1-oxyl
2,2,6,6-tetramethyl-4-hydroxy-1-piperidin-1-oxyl toluene sulfonate
2,2,6,6-tetramethyl-4-hydroxy-1-piperidin-1-oxyl 3,5-dinitro-benzoate
2,2,6,6-tetramethyl-4-hydroxy-1-piperidin-1-oxyl phenylcarbamate
β-(phenylnitrogen oxide)-β-methylpentane-Δ-one oximephenylether (Banfield and Kenyon's radical)
di-t.butyl nitroxide
t.butyl-2,6-dimethoxyphenylnitroxide
4,4'-dimethoxydiphenylnitroxide
diphenyl nitroxide
bis(trifluoromethyl)nitroxide
4,4'-bis(2,2,6,6-tetramethyl piperidine nitrogen oxide
2,2,6,6-tetramethyl-4-bromo-1,2,5,6-tetrahydropyridin-1-oxyl
2,2,6,6-tetramethyl-4-chloro-1,2,5,6-tetrahydropyridin-1-oxyyl 2,2,4,4-tetramethyl-1,2,3,4-tetrahydro-p-carboline-3-oxyl
2,2,5,5-tetramethyl-1-aza-4-cyclopentene-4-carboxamide-1-oxide
2,2,6,6-tetramethyl-1-aza-4-cyclohexanol-4-methyl-1-oxide
2,2,5,5-tetramethyl-1-aza-cyclopentene-1-oxide
2,2,5,5-tetramethyl-1-aza-3-cyclopentanol-1-oxide
2,2,5,5-tetramethyl-1-aza-3-cyclopentanene-1-oxide-3-oxime
4,5,5,4',5'-hexamethyl-2,2'-aza-1,1'-pyrroline-1,1'-dioxide
5,5:5',5'-dispirocyclohexyl-2,2'-azo-1,1'-pyrroline-1,1'-dioxide
3,5,5,3',5',5'-hexamethyl-2,2'-azo-1,1'-pyrroline-1,1'-dioxide
5,5,5',5'-tetramethyl-2,2'-azo-1,1'-pyrroline-1,1'-dioxide
Porphyrexide
Porphyrindin
Dichloroporphyrexin
2,4-diimino-1,3-diazospiro (4,5)-1-decyl-1-oxide
4,4'-bis (2,2,6,6-tetramethylpiperidinenitrogen oxide)
2,4',6-trimethoxydiphenylnitroxide
2,4',6-trimethoxydiphenylnitroxide
N-phenyl-p-benzoquinoneimine-N-oxide
N-(p-chlorophenyl)-p-benzoquinoneimine-N-oxide
1,1-dimethyl-3-(N-p-tolyloximino) butyl-p-tolylnitroxide
1,1-dimethyl-3 (N-m-tolyloximino) butyl-p-tolylnitroxide
diphenylaminopicrylnitroxide
di-p-anisylnitroxide
Fremy's salt (nitrosyldisulfonate ion)
3-amino-2,2,5,5-tetramethyl-1-pyrrolidinyloxy
3-carbamoyl-2,2,5,5-tetramethyl-3-pyrrolin-1-yloxy
3-carbamoyl-2,2,5,5-tetramethyl-1-pyrrolidinyloxy
3-cyano-2,2,5,5-tetramethyl-3-pyrrolin-1-yloxy
3-cyano-2,2,5,5-tetramethyl-1-pyrrolidinyloxy
2,2,5,5-tetramethyl-3-oxo-1-pyrrolidinyloxy
4-methyl-2-spirocyclohexyl-3,4:3',2'-tetrahydrofurano-1,2,3,4-tetrahydroquinoline-1-oxide
di-2,2,6,6-tetramethylpiperidin-1-oxyl-4-hexamethylenedicarbamate
di-2,2,6,6-tetramethylpiperidin-1-oxyl-4-oxalate
di-2,2,6,6-tetramethylpiperidin-1-oxyl-4-succinate
di-2,2,6,6-tetramethylpiperidin-1-oxyl-4-adipate
di-2,2,6,6-tetramethylpiperidin-1-oxyl-4-pimelate
di-2,2,6,6-tetramethylpiperidin-1-oxyl-4-sebacate
di-2,2,6,6-tetramethylpiperidin-1-oxyl-4-terephthalate
N,N-di-2,2,6,6-tetramethyl-4-piperidyl-1-oxylurea
tri-(2,2,6,6-tetramethyl piperidine-1-oxyl) trimesate
tri-(2,2,6,6-tetramethylpiperidine-1-oxyl) phosphite
2,2,2',2',6,6,6',6'-octamethyl-4-dipiperidyl-1,1'-dioxyl
2,2,6,6-tetramethyl-4-hydroxypiperidine-1-oxylbenzoate
2,2,6,6-tetramethyl-4-hydroxypiperidine-1-acid phthalate
tetra-2,2,6,6-tetramethyl-4-hydroxypiperidine-1-orthosilicate ester
tetra-2,2,6,6-tetramethyl-4-hydroxypiperidine-1-pyromellitate
di-2,2,6,6-tetramethyl-4-hydroxypiperidine-1-phthalate
monoethyl-2,2,6,6-tetramethyl-1-oxylpiperidylidene-succinate
monomethyl-2,2,6,6-tetramethyl-1-oxylpiperidylidene succinic acid
dimethyl-2,2,6,6-tetramethyl-1-oxylpiperidylidene succinic acid
methyl-2,2,6,6-tetramethyl-1-oxylpiperidylidene succinic acid
ethyl-2,2,6,6-tetramethyl-1-oxylpiperidylidene succinic acid
monomethyl-2,2,6,6-tetramethyl-1-oxylpiperidylidene succinic acid
monoethyl-2,2,6,6-tetramethyl-1-oxylpiperidylidene succinic acid
6-inethoxy-4-methyl-2-spirocyclohexyl-3,4:3',2:-tetrafurano-1,2,3,4-tetrahydroquinolin-1-oxyl
2,2',4,4',5,5'-hexaphenyl-1,1'-biimidazolyl and the substituted phenyl homologs The colors of the aroxyls vary from yellow orange to blue. Representative of this class useful in the invention are the following:

AROXYLS

Galvinoxyl
Bisgalvinoxyl
2,4,6-tri-t.butylphenoxyl
2,6-di-t. butyl-4(3,5-di-t. butyl-4-cyclohexa-2,5-dienylidene amino) phenoxy
2,6,2',6'-tetra-t-butyl-4,4'-(3-,5-di-t.butyl-4-oxocyclohexa-2,5-dienylidene methyl) diphenoxy
2,4,6-triphenylphenoxyl
2,2-bis (3,5-di-t. butyl-4-phenoxyl) propane
2,2'-bis (3,5-di-t. -butyl-4-phenoxyl) biphenylene
4,6-di t. butyl-2-t. butyloxy phenoxy
4-cyano-2,6-di-t. butylphenoxyl
2,6-di-t. butyl-4-methoxyphenoxyl
2,3,4-trichloronaphthoxyl
9-chloro-1-phenoxanthryl The colors of the carbon free radicals vary from yellow to red. Representatives of this class useful in the invention are the following:

CARBON FREE RADICALS

α,γ-bisdiphenylene-β-phenylallyl
α,γ-bisdiphenylene-β-(p-isopropylphenyl) allyl
α,γ-bisdiphenylene-β-(p-isopropenylphenyl) allyl
perchlorodiphenylmethyl
triphenylmethyl
diphenylbiphenylmethyl
phenyldibiphenylmethyl
dimethoxytriphenylmethyl
4,4-polymethylene bis triphenyl methyl
pentaphenylcyclopentadienyl
perchlorophenylmethyl
o-ethoxyphenyldiphenylmethyl
9-phenylfluorenyl
diphenyl-β-naphthylmethyl
α-methoxydiphenylmethyl
dimesityl methyl
p,p'-triphenylene bis (diphenylmethyl)
dioxadihydrocoeranthryl
α-naphthyldibiphenylmethyl
pentaphenylethyl
bis (2,5-di-t. butylphenyl) methyl
dibensofulvenylmethyl
perchloro-4-phenyldiphenylmethyl
perchloro-4,4' diphenyldiphenylmethyl
perchlorotriphenyl methyl
perchloro-4-phenyltriphenyl methyl
perchloro-4,4'-diphenyltriphenyl methyl
perchloro-4,4'4''-triphenyltriphenyl methyl The ion free radicals differ somewhat from the others in that the stability of many of these free radicals is dependent on pH since they are ionic. The colors are quite intense and cover the visible spectrum.

As aforesaid, they may be broken down into the classes (a), (b), (c), (d), (e), (f), (g), (h) and (i) referred to above.

Representative of the class (a) Wurster radicals are the following:

Wurster blue
Wurster red
Stable free radicals derived from N-diphenylmethylene-aniline by oxidation, e.g. with bromine
Stable free radicals derived from N,N,N',N'-tetramethyl-diaminodurene by oxidation, e.g. with bromine Representative of the class (b) Weitz's radicals are the following:

violenes of the type $^{+}X—(CH=CH)_n—X^{+}$ such as the bipyrenes, e.g. tetramethyl and tetraphenyl bipyrene, and the thiobipyrenes such as tetraphenyl thiobipyrene diazobiolenes, such as those attained by reacting hydrazine with a heterocyclic quaternary ammonium salt, such as the quaternary ammonium salt of N-alkyl (methyl), 2-halo (or ether or thioether) pyridine and having the formula:

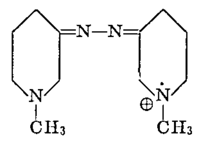

and also the compound:

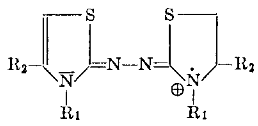

where $R_1$ is $CH_3$ or aryl and $R_2$ is $CH_3$ or hydrogen and also the compound:

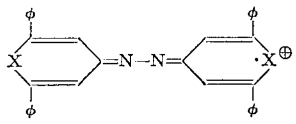

where X is >N—$CH_3$ or >S and φ is phenyl.

Representative of the class (c) semiquinones are the following:

semiquinone
semiquinone from 2,2'-biisobenzimidazolylidene by oxidation, e.g. with bromine
quinoxaline semiquinone
chlorpromazine semiquinone
methylene blue semiquinones
Semiquinone from diphenoquinone-4,4'-bis-dimethyl-immonium salt by oxidation, e.g. with bromine
Indomine semiquinones
indophenol semiquinones
p-benzosemiquinone
chloranil-N,N-dimethylaniline semiquinone
semiquinone from tetramethylbenzidine by oxidation, e.g. with bromine
camphor quinone semiquinones
1,6-diaminodurene-pyrene semiquinone radical ions
1,6-diaminodurene-2,3-dichloro - 5,6 - dicyanobenzoquinone semiquinone radical ions
1,6-diaminodurene-bromanil semiquinone radical ions
1,6-diaminodurene-chloranil semiquinone radical ions
1,6-diaminodurene-iodanil semiquinone radical ions
pyocyanine quinhydrone Representative of the class (d) cyanoquinone dimethane and cyanonaphthoquinonedimethane free radicals are the following:

tetracyanoquinodimethane (TCNQ) $(C_2H_5)_3NH^+$
TCNQ$^{\dot{-}}$$(C_2H_5)_3NH^+$_TCNQ
TCNQ$^{\dot{-}}$Quinaldine $^+$_TCNQ
TCNQ$^{\dot{-}}$$(C_6HCl_3)PCH_3^+$_TCNQ
TCNQ$^{\dot{-}}$$(C_6H_5)_3AsCN^+$_TCNQ
cesium tetracyanoquinodimethane
TCNQ. triphenylmethylphosphonium
TCNQ–tetramethyl-p-phenylene diamine
Amino, phospheno, arseno and cesium salts of 11, 11, 12, 12-tetracyanonaphtho-2,6-quinodimethane Representative of the class (e) polynuclear aromatic and heterocyclic free radicals are the reaction products of alkali metal, i.e., sodium, potassium, lithium, cesium, with the following polynuclear aromatic and heterocyclic compounds:

thioxanthen-9-10,10-dioxide
9,10-di phenylanthracene
methylviologen
9,10-diethylanthracene
9-ethylanthracene
lumoflavine
acenaphthylene
1,4,5,8-tetraazanaphthalene
9-dicyanomethylene-2,4,7-trinitro fluorene
2,1,3-benzoxadiazole
9,10-diazaphenanthrene
perinaphthene
1,8-dinitronaphthalene
1,4,5,8-tetranitronaphthalene
pentacene Examples of the class (f) polynuclear aromatic and heterocyclic chlorate free radicals are as follows:

1-methyl-2-phenylindolizine monoperchlorate
1,2-dimethyl-3-indolizinum monochlorate Examples of the class (g) carbazole boron fluoride free radicals are as follows:

carbazole- $C_7H_7^+BF_4^-$
N-methylcarbazole-$C_7H_7^+BF_4^-$

In addition to the above classes of ionic free radicals,. the following can also be used:

cation radical from tetra kis (dimethylamino) ethylene
1,2,4,5-tetramethylthiobenzene-Sb $Cl_5$
N,N′-dihydro-1,4-diazine cation
stable free radicals derived from hexamethyl radialene
stable free radicals derived from hexaethylradialene
stable free radicals derived from diphenylacetylene
stable free radicals derived from dibenzocyclobutadiene
stable free radicals derived from cycloheptafluorene
stable free radicals derived from dodecamethylcyclohexasilane
stable free radicals derived from tetraphenylallyl
stable free redicals derived from 2,2′-bipyrimidine
stable free radicals derived from nitrobenzophenones
Koelsch's radical
stable free radicals derived from 3,3′-dinitrobenzil
Tanone
stable free radicals derived from trans stilbene
stable free radicals derived from ninhydrin
stable free radicals derived from alloxan The aforesaid stable free radicals may be complexed with other compounds as well known in the art. Complexing serves the purpose of stabilization to moisture or oxygen, or change to a more useful physical form, e.g. gas to solid, or changes color of the stable free radical, and, in some cases, its melting point.

Examples of classes of complexing compounds which can be used are inclusion complexing materials, e.g. urea, thiourea, gammadextrin, and other well known inclusion complexing compounds, which form a channel or a cavity within which the stable free radical is trapped. The particular type of inclusion compound for any stable free radical depends on the molecular structure of the free radical. For example, urea will form complexes with straight chain aliphatic free radicals, thiourea forms complexes with branch chain aliphatic radicals and with alicyclic free radicals. The gamma dextrins, or the so-called Schardinger dextrins, form inclusion compounds with a variety of free radical structures. There are other well known inclusion complexing materials which will function in a similar manner.

A second class of complexing compounds are materials which form clathrate molecular complexes. Among the numerous classes of such complexing compounds are the bile acids, such as desoxy cholic acids, the flavans, the Werner complexes, hydroquinone, etc. These form a crystal cage completely surrounding the free radical.

A third class of complexing compounds are the charge transfer types. These include carbon disulfide, triphenyl phosphate, aromatic and nitro aromatic solvents, such as benzene, toluene, naphthalene, nitrobenzene, xylene, the ether solvents, such as dioxane, diethyl ether, and organic ester solvents, such as alkyl (e.g. ethyl) acetate, tetrachloro and tetrabromo phthalic acid esters and anhydrides and TCNQ, all of which form weak bonds with amines, amides, azo compounds and nitro aromatics and aliphatics.

A fourth class of complexing compounds are pi complexing compounds such as chloranil, bromanil, iodanil and other well known pi complexing compounds, which will form complexes with amines, aromatics, nitroaromatics and ethers, and all of which are well known.

A fifth class of complexing compounds are hydrogen bonding molecular complexing compounds, such as the bisphenols and other aromatic hydroxy compounds, which form hydrogen bond complexes with the amides, the amines, hydrazines, hydrazides and which are well known.

The following complexes of the different types of stable free radicals can be used and have been reported in the literature:

α,α-diphenyl-β-picrylhydrazyl with benzene, carbon disulfide, toluene, nitrobenzene, dioxane, amyl acetate, and xylene.
picryl-N-amino carbazyl complexes with carbon disulfide and benzene
α,α - diphenyl-β-2,6-dinitro-4-carboxyphenylhydrazy complexes with ether.
triphenylmethyl complexes with ethers, esters, ketones, and aldehydes.
methylviologen radical complexes
gamma irradiated ketone radical complex as urea inclusion compounds.
2,2,6,6 - tetramethylpentamethyleneamine-N-oxide forms H-bond complexes with alcohols
semiquinone radical ions form molecular complexes
Wurster's blue perchlorate and N-ethylphenazyl form pi complexes
perhydrotriphenylene forms inclusion compounds with free radicals
2,4,6-triphenylphenoxyl forms complexes with benzenes, xylenes, and pyridine
tetramethyl thiobenzene cation radical forms a complex complexes with SbCl5
dianisylazotoxy forms a pi complex with ethyl benzene.
nitroxides form pi complexes with ethyl benzene.

The stable free radicals may also be stabilized by absorption on the oxides of silicon, aluminum, zinc, zirconium, tungsten.

The light sensitive free radical precursors useful in the present invention are those selected from the group consisting of:

(1) Nitroaliphatic compounds such as tetranitromethane, trinitromethane, hexanitroethane and t.butyl nitrite. The effectiveness of these materials is increased by the addition of organic unsaturated aliphatic and alicyclic compounds such as transcinnamic acid, transcinnamaldehyde, α-methylcinnamic acid, α-methylcinnamaldehyde, phorone, isophorone, acrylamide, methacrylamide, maleic acid;

(2) Para-tert-amino aromatic compounds such as p-dimethylaminobenzaldehyde, p-diethylaminobenzaldehyde, 4,4′-bis diethyl amino benzophenone, 4,4′-bisdimethylaminobenzophenone, 4,4′-bis dimethyl amino thiobenzophenone, 4,4′-bis diethylaminobenzophenone, N,N,N′,N′-tetramethylbenzidine, N,N-diethyl-p-nitrosoaniline.

(3) Highly halogenated aliphatic, alicyclic and aromatic hydrocarbons such as carbon tetraiodide, carbon tetrabromide, carbon tetrachloride, iodoform, bromoform, chloroform, diiodo methane, dibromomethane, dichloromethane, hexachloroethane, benzotrichloride, p-nitrobenzotribromide, tetrachlorotetrahydronaphthalene, benzotribromide, pentabromoethane, tetrabromoethane, α,α-dichlorotoluene, 1,1-dibromoethane, 1,1-dichloroethane, 1,1,2-trichloroethane, polyvinylchlorideleuco base complexes, bromo trichloromethane, pentabromoethane, hexachlorocyclobutadiene, hexachlorocyclohexane.

(4) Quinones such as chloranil, benzoquinone, 2,5-di-t.butylbenzoquinone, 2,5-dichloro-3,6-dihydroxy benzoquinone, 2,5-diphenylbenzoquinone, 1,4-naphthoquinone, 2,3-dichloro-1-naphthoquinone, 2-methylanthraquinone, phenanthrenequinone, 1,2-naphthoquinone, tetrachloro-o-benzoquinone.

(5) Phototropic (having the property of reversibly changing color with different wave lengths of light) free radical precursors, which include:

(a) the anthrones and their homologues, such as anthrone, bianthrone, alkyl and phenyl substituted anthrone, bianthrone and benzylidene and anthrylidene substituted anthrone;

(b) tertiary amino triaryl methane, unsubstituted and in which the methane hydrogen is substituted by the cyano or hydroxyl group, such as 4,4′,4″ diethyl amino triphenyl methane, 4,4′,4″ diethyl amino triphenyl methane nitrile, dimethyl amino triphenyl carbinol, morphalino or piperidino triphenyl methane and dicyclohexyl amino triphenyl amine. The amino group may be on one or more of the aryl groups. The aryl groups can be all phenyl or may be all naphthyl or naphthyl phenyl. The amino nitrogen may be part of a heterocyclic ring, an alicyclic ring or have attached thereto alkyl or alicyclic groups;

(c) oxidized lophines such as 1,1′-biimidazolyl, and 2,2′,4,4′,5,5′-hexaphenyl-1,1′-biimidazoyl unsubstituted or substituted in one or more of the phenyl rings with one or more of the groups alkyl, ether, hydroxyl, halogen and nitro;

(d) the anilides (known as Schiff bases) formed by reaction of aromatic aldehydes and aromatic amines, such as tetrachlorosalicyl anilide and 4, nitrosalicylanilide;

(e) aromatic ketones such as tetrochloroketodihydronaphthalene and phenylene-1-one.

(6) Azo compounds such as Diazald, azomethane, azobis (isobutyronitrile) called AZDN.

(7) Aromatic disulfides such as benzothiazyldisulfide.

(8) Organic silanes such as the triallyloxy-vinyl silane, dimethoxydiphenyl silane.

(9) Halo-amides and imides such as N-iodosuccinimide, N-bromosuccinimide, N-iodo succinimide, dichloroacetamide.

(10) The halogens, particularly iodine, when complexed in known manner to form a stable solid, such as iodine with pyrrolidone or vinyl pyrrolidone and its polymers and copolymers (one such complex is sold by General Aniline Company as PVP iodine).

(11) Organic N-nitroso compounds, such as Diazald, National Polychemical NP–1, NP–7.

(12) Aromatic sulphone hydrazides, such as benzene sulphon hydrozide and National Polychemical NP3 and NP4.

(13) Substituted pyrroles such as 2,3,4,5-tetraphenylpyrrole and 2,5-dimethyl-1-phenylpyrrole.

All of these classes of precursors are known for their property of being sensitive ot light to form transient free radicals.

Certain of the free radical precursors can be complexed to reduce odor, toxicity, volatility, color and increase stability. Iodine forms many molecular complexes such as inclusion complexes (e.g. with urea, cellulose, starches, dextrins), pi complexes (e.g. with chloranil, bromanil), clatharate complexes (e.g. with bile acids, flavans, Werner complexes, hydroquinone, etc.) and charge transfer complexes (e.g. with amines, ethers, pyrrolidones, vinyl pyrrolidone and its polymers and copolymers, fused ring aromatics, such as anthracene, perylene, penanthrene, etc.). These classes of complexes have been previously described. Iodoform can be complexed with sulfur, dithiane, stearoids, urea, cellulose, amines and aromatics to form inclusion or charge transfer complexes, as previously described. Carbon tetrachloride can be complexed with bile acids, steroids, aromatics, cellulose, and amines. These are just a few examples of the types of complexes which can be formed with many of the free radical precursors.

Promoters for the generation and reaction of the transient free radicals include:

(1) Aromatic aldehydes such as transcinnamaldehyde, anisaldehyde, 2,3-dimethoxybenzaldehyde, 2,5-dimethoxybenzaldehyde, 3,4-dimethoxybenzaldehyde, 3,4-diethoxybenzaldehyde, 1-naphthaldehyde, o-methoxybenzaldehyde, p-tolualdehyde, 3,4,5-trimethoxybenzaldehyde, terephthaldehyde, 3-benzyloxybenzaldehyde, p-diethylaminobenzaldehyde, p-dimethylaminobenzaldehyde, p-N,N-dimethylaminocinnamaldehyde, 4-(2-N,N-diethylaminoethoxy) benzaldehyde.

(2) Aromatic ketones and ether, thioether and amino substituted aromatic ketones, such as 4,4″-oxydibenzophenone, 4,4′-bis (dimethylamino) benzophenone, 4,4′-bis (diethylamino) benzophenone, 4,4′-bis (dimethylamino) thiobenzophenone, 2-methoxy-2-phenylacetophenone.

(3) Ethers, preferably aromatic and silano ethers, such as bis (o-methoxyphenyl) carbonate, anisyl alcohol, 2,4-dichloranisole, ethylanisate, veratrole, (p-methoxyphenyl) acetonitrile, thioanisole, 3-benzyloxybenzaldehyde, 4,4″-oxydibenzophenone, 4-(p-methoxyphenyl)-3-buten-2-one, o-diethoxybenzene, 4,4′-oxydianisole, 2,4,6-tribromoanisole, 4-methylveratrole, 4-benzyloxyanisole, p-anisylbenzyl ketone, 4-allylanisole, 3,4,5-trimethoxybenzonitrile, triallyloxyvinylsilane, dimethoxydiphenylsilane, 4-iodoanisole, 3,4-dimethoxybenzonitrile, 4-methoxybenzyl, 1,3-dimethoxy-4-nitrobenzene, anisonitrile, anethole, allylphenylether.

(4) Nitriles, preferably aromatic and unsaturated aliphatic nitriles, such as anisonitrile, 4-biphenylcarbonitrile, p-nitrobenzonitrile, 3,4-dimethoxybenzonitrile, 3,4,5-trimethoxybenzonitrile, phthalonitrile, p-chlorobenzonitrile, terephthalonitrile 4-biphenylcarbonitrile, crotononitrile, p-chlorobenzonitrile, p-tolunitrile, (p-methoxyphenyl) acetonitrile, p-cyanobenzaldehyde, p-diethylaminobenzonitrile, p-dimethylaminobenzonitrile.

(5) Esters, preferably aromatic esters, such as ethyl-p-dimethylaminobenzoate, ethyl-α-cyanocinnamate, ethylanisate, bis (p-methoxyphenyl) carbonate.

(6) Unsaturated compounds, preferably unsaturated ethers, aldehydes, amides, imides, silanes, esters, aromatics and nitriles, such as allylphenylether, trans cinnamaldehyde, N-vinylphthalimide, acrylamide, lauryl methacrylate, triallyloxyvinylsilane, butyl methacrylate, stearyl methacrylate, lauryl methacrylate, p-diisopropenylbenzene, 4-allylanisole, ethyl-α-cyanocinnamate, 4-(p-methoxyphenyl)-3-buten-2-one, crotononitrile, isosafrole, eugenol, isoeugenol, p-N,N-dimethylaminocinnamaldehyde, anethole, N-tert. butyl acrylamide.

(7) Aromatic sulfon amides, such as N,N dimethyl-p-toluenesulfonamide and the aromatic sulfonamides sold by Monsanto Chemical Company under the trade names Santocure and Santicizer.

The highly electrical resistant plastic binders useful in the present invention are those conventionally used as binders for electrostatic reproduction sheets, all of which have an electrical resistance of at least $10^9$ ohms per square, e.g. Electrofax, which include the vinyl, acrylic, alkacrylic, and diene resins, silicones and polyesters, including the condensation and unsaturated polyesters. Examples are polystyrene polymers and copolymers such as styrene-butadiene copolymer, polyvinyl acetate terpolymers and copolymers, acrylic and modified acrylic resins, methacrylic and modified methacrylic resins, alkyds, silicones, etc.

The compositions of the present invention, i.e. the mixture of stable free radicals, precursor and binder with or without promoter, or the mixture of quinones or anthroquinones and binder with or without other precursors or promoters, can be applied as a coating to a sheet or web, such as paper, metal foil, plastic film, etc., stored in a dark, light-proof container of known type and used with an infra red thermofax copier, a UV copier, such as a Bruning diazo copier or a visible light printer or projector together with a conventional electrostatic charging and developing unit. In such case, they are applied to the web as a liquid (in the form of a solution or dispersion) in a suitable carrier, dried and packaged under safe light conditions. The compositions may also be stored and sold in liquid form in light-proof, dark containers of known type and added to the copying machines of the type utilizing liquids, in which the liquid is applied as a coating to the sheet in the machine at the time of use.

In either case, either shortly before or after the image is made by exposure to light, an electrostatic charge is placed on the coating by conventional means normally used in electrostatic processes. After charging and imaging, the image is developed in conventional manner with dry or liquid toners conventionally used in electrostatic processes. The toner can then be fixed in a conventional manner, e.g. by heat, to make the image permanent, or the toner image may be transferred by contact or by pressure to another sheet, e.g. plain paper. In the latter case, the transferred image is fixed and the original can be charged and toned again. In this way, an unlimited number of copies can be made from the original. This is an important advantage over the Electrofax and Xerox processes and provides an economical method of producing an unlimited number of copies in a much less complex office copying machine, as compared to the Xerox machine.

When the coating composition is applied to the sheet as a solution in the copier solvent, the resulting dried coating is a solid solution of the chemicals in the binder so that the coating is transparent. This provides important advantages.

The electrostatic coatings of this invention are relatively light in weight, transparent, and relatively resistant to change with variations in humidity, as compared to conventional electrostatic coatings. They do not require milling to obtain a satisfactory pigment particle size as is necessary for the zinc oxide "Electrofax" coatings. Being unpigmented, the coatings have greater mar resistance and a less objectionable feel than the "Electrofax" papers. Only minor percentages of reactive materials are required. Since grinding is unnecessary and the amount of chemicals required is low, an economic advantage is gained. The coatings are transparent and can be coated on translucent or transparent base stock. This property is useful in preparing masters for diazo reproduction, and for preparing transparencies for projectors, and for making microfilm systems. The advantages of having both positive and negative copying capabilities is obvious. The aforesaid ability to retain conductive latent images allows this invention to be useful in plate making for electrostatic printing processes.

The ability to copy with infra-red, visible, or ultraviolet light permits the use of the electrostatic sheets of the present invention with an imaging machine such as a diazo office copier, or a "Thermofax" thermocopier, or a tungsten light printer together with a conventional electrostatic charging and developing unit to give quality reproductions with outstanding permanence of the copy.

As aforesaid, the invention is equally applicable to the use of a light sensitive copy sheet with the chemicals in the form of a dried coating on the copy sheet, or the light-sensitive chemicals can be applied, as a coating to plain conductive base stock in the copying machine before imaging.

Any inert solvent carrier can be used in preparing the coating compositions of the present invention. Examples are the aliphatic and aromatic hydrocarbons, such as toluene and benzene; alcohols, such as methanol; ketones, such as methyl ethyl ketone; esters, such as methyl acetate; etc. However, it is desirable that it be readily volatile so that when the composition has been applied to the backing sheet, it can be easily dried.

The particular amounts of stable free radical and precursor or quinones or anthrones are chosen so that when they are formed into a coating with a binder and are exposed to the particular light source with which they are to be used, they will change the conductivity by at least 100 times. The optimum amounts can be readily ascertained by routine experiment and will vary substantially depending on the particular chemicals used as well as the light source, e.g. each of the stable free radicals has a different degree of steric hindrance around the unpaired electron and the rate of reaction of such electron will vary according to the magnitude of the steric hindrance. Also, the free radicals generated from different precursors vary in reactivity because they have different sizes also and because they differ in their lifetimes. The larger sizes and the shorter lifetimes result in greater difficulty in reacting with the unpaired electrons of the stable free radical to achieve adequate change in conductivity. The more difficult the reaction, the greater amount of precursor is required. In most cases, with stable free radical-precursor systems the molar ratio of precursor to stable free radicals is greater than one.

The amount of binder should be sufficient to give a total electrical resistance of the coating systems of not substantially less than $10^9$ ohms per square and to provide adequate binding of the coatings to the binding sheet.

The amount of carrier should be sufficient to provide readily coatable solutions or dispersions.

The amount of promoter, when one is used, may vary over a wide range so long as it does not lower the conductivity of the coating system to below $10^9$ ohms per square.

EXAMPLES

1st group

The following examples were prepared to illustrate the preparation of toner developed negative electrostatic images in accordance with the invention. In each case the electrical resistance in the light-struck areas was increased over that in the non-exposed areas so that electrostatic toner development produced a negative of the original master.

In each case, two grams of the photo-responsive quinone or anthrone was dissolved in 100 grams of a twenty percent solution of polystyrene in toluene. The resulting solution was coated onto a standard electroconductive paper base stock to give a dry weight of coating between 5 and 15 pounds per 3000 square feet. The dried sheets were imaged on a Bruning model 110 diazo office copier using an Andrews silver 14 step wedge as a master. The imaged sheets were then passed through the electrostatic charging and toner development unit of an Electrofax SCM model 33 electrostatic copier using SCM toner. Negative images of the silver step wedge original were formed in all cases. The quinones and anthrones used were as follows:

(1) Chloranil
(2) 1,2-naphthoquinone
(3) 2,3-dichloro-1,4-naphthoquinone
(4) 2,5-dichloro-p-benzoquinone
(5) 2,6-dichloro-p-benzoquinone
(6) 1,2-naphthoquinone
(7) 2,5-di-t.butyl-p-benzoquinone
(8) 2-methyl-1,4-naphthoquinone
(9) methyl-p-benzoquinone
(10) 2,5-dimethyl-p-benzoquinone
(11) phenanthrenequinone
(12) anthrone
(13) bianthrone

2nd group

The following examples show how the preceding photochemical systems can produce positive images by use of the proper coreactants. The coatings were applied and the coated sheets were imaged, electrostatically charged, and toner developed in the manner previously described. All copies gave positive toner developed images. The coating compositions contained the following materials. All ingredients were dissolved in 100 grams of 20% polystyrene in toluene.

(14) 2.0 g. diethylaminobenzaldehyde (precursor), 1.0 g. 2,5-dimethoxybenzaldehyde (promoter) and 1.0 g. 2,3-dichloro-1,4-naphthoquinone.

(15) 2.0 g. diethylaminobenzaldehyde, 1.0 g. 2,5-dimethoxybenzaldehyde, 3.0 g. triacetoneamine-N-oxide (stable free radical), and 1.0 g. 2,3-dichloro-1,4-naphthoquinone.

(16) 2.0 g. diethylaminobenzaldehyde, 1.0 g. 2,5-dimethoxybenzaldehyde, 3.0 g. triacetoneamine-N-oxide, 1.0 g. 2,5-dichloro-p-benzoquinone.

(17) 2.0 g. diethylaminobenzaldehyde, 1.0 g. 2,5-dimethoxybenzaldehyde, 3.0 g. triacetoneamine-N-oxide, 1.0 g. 2,3-dichloro-1,4-naphthoquinone.

(18) 2.0 g. diethylaminobenzaldehyde, 1.0 g. 2,5-dimethoxybenzaldehyde, 3.0 g. triacetoneamine-N-oxide, 1.0 g. 2,5-dichloro-p-benzoquinone.

(19) Example 15 with 1 g. veratrole, (promoter) in addition to the other ingredients

(20) Example 16 with 1 g. veratrole in addition to the other ingredients.

(21) Example 18 with 1 g. veratrole in addition to the other ingredients.

(22) 2.0 g. diethylaminobenzaldehyde, 1.0 g. 2,5-dimethoxybenzaldehyde, 1.0 g. bianthrone, 3.0 g. triacetoneamine-N-oxide.

(23) Example 22 with 1 g. veratrole in addition to the other ingredients.

(24) 2.0 g. diethylaminobenzaldehyde, 1.0 g. 2,5-dimethoxybenzaldehyde, 3.0 g. triacetoneamine-N-oxide, 1.0 g. 1,2-naphthoquinone, 1.0 g. veratrole.

(25) 2.0 g. diethylaminobenzaldehyde, 1.0 g. 2,5-dimethoxybenzaldehyde, 3.0 g. triacetoneamine-N-oxide, 1.0 g. anthrone, 1.0 g. veratrole.

(26) 2.0 g. diethylaminobenzaldehyde, 1.0 g. 2,5-dimethoxybenzaldehyde, 1.0 g. 2,6-dichloro-p-benzoquinone, 1.0 g. veratrole.

(27) 2.0 g. diethylaminobenzaldehyde, 1.0 g. 2,5-dimethoxybenzaldehyde, 1.0 g. 1,2-naphthoquinone, 1.0 g. veratrole.

3rd group

The following examples illustrate the use of stable free radicals as one of the reactants with free radical precursors to give photochemical images which can be charged electrostatically and toner developed to produce positive images in the previously described manner.

The basic formula used was 100 g. 20% polystyrene (Dow Styron 666) in toluene, 1.0 g. iodoform (precursor), 1.0 g. Diazald (precursor), 0.5 g. 2,5-dimethoxybenzaldehyde (promoter), 0.2 g. silver diethyldithiocarbamate (promoter), and 3.0 g. of the stable free radical all in solution. Coated, exposed, charged, and developed in the manner set forth above with respect to the Group I examples, the coatings containing the following stable free radicals gave excellent positive, toner developed images.

(28) Triacetoneamine-N-oxide.

(29) $\alpha,\alpha$-diphenyl-$\beta$-picrylhydrazyl.

(30) Banfield and Kenyon's radical.

(31) Bisgalvinoxyl.

(32) Galvinoxyl.

(33) 2,2,4,4 - tetramethyl-1,2,3,4-tetrahydro-$\gamma$-carboline-3-oxyl.

(34) 2,6 - di - t.butyl-4-(3,5-di-t.butyl-4-cyclohexa-2,5-dienylideneamino) phenoxy.

(35) $\alpha$-phenyl-$\alpha$($\beta$-naphthyl)-$\alpha$-picrylhydrazyl.

(36) 2,4-dinitrophenylhydrazone of triacetoneamine-N-oxide.

(37) 2,2,7,7-tetramethyl-homopiperazone-N-oxide.

(38) Triacetoneamine-N-oxide oxime.

4th group

Promoters can be used with the stable free radical-free radical precursor system to increase the speed and sensitivity. The following promoters were combined with the triacetoneamine-N-oxide and the free radical precursor iodoform of formulation 28 of the 3rd Group (1.0 gram of the promoter was substituted for the 2,5-dimethoxybenzaldehyde and the silver diethyl dithiocarbamate), coated, and imaged at the fastest speed on the Bruning 110 and the image was developed in the normal manner on the SCM 33 copier. The 14 step Andrews master was used and the figures under the step wedge column indicated the improvement in speed by steps.

| | Promoter | Step wedge |
|---|---|---|
| (39) | Benzil anti-monoxime | +3 |
| (40) | Anisonitrile | +2 |
| (41) | 4-biphenylcarbonitrile | +4 |
| (42) | p-Nitrobenzonitrile | +2 |
| (43) | Anethole | +5 |
| (44) | Deoxybenzoin | +2 |
| (45) | Allyphenylether | +2 |
| (46) | N,N-dimethyl-p-phenylazoaniline | +2 |
| (47) | N,N-dimethyl-p-nitrosoaniline | +5 |
| (48) | N,N-dimethyl-p-nitroaniline | +3 |
| (49) | N,N-dimethyl-1-naphthylamine | +3 |
| (50) | N,N-dimethyl-p-1-naphthylazoaniline | +2 |
| (51) | N,N-dimethyl-p-toluidine | +5 |
| (52) | N,N-diethylaniline | +6 |
| (53) | 4-iodoanisole | +2.5 |
| (54) | 3,4-dimethoxybenzonitrile | +3 |
| (55) | 4-methoxybenzil | +1.5 |
| (56) | 1,3-dimethoxy-4-nitrobenzene | +3 |
| (57) | Ethyl-p-dimethylaminobenzoate | +3.5 |
| (58) | Trans cinnamaldehyde | +4.5 |
| (59) | N-vinylphthalimide | +2.5 |
| (60) | Triphenylphosphine | +1 |
| (61) | Lauryl methacrylate | +5.5 |
| (62) | Triallyloxyvinylsilane | +6 |
| (63) | Dimethoxydiphenylsilane | +4.5 |
| (64) | 2,3,4,5-tetraphenylpyrrole | +2.5 |
| (65) | Butylacrylate | +2 |
| (66) | Butylmethacrylate | +5 |
| (67) | Stearylmethacrylate | +8 |
| (68) | Laurylmethacrylate | +6 |
| (69) | 4-dimethylaminobenzonitrile | +4 |
| (70) | p-Diisopropenylbenzene | +3.5 |
| (71) | 3,4,5-trimethoxybenzonitrile | +3 |
| (72) | 4-methylveratrole | +5 |
| (73) | 4-benzyloxyanisole | +4 |
| (74) | p-Anisylbenzylketone | +3 |
| (75) | 4-allylanisole | +3 |
| (76) | Phthalonitrile | +2 |
| (77) | Terphthaldehyde | +1.5 |
| (78) | N,N-dimethyl-p-toluenesulfonamide | +3 |
| (79) | 4,4''-oxydibenzophenone | +2.5 |
| (80) | p-Chlorobenzonitrile | +2 |
| (81) | Ethyl-a-cyanocinnamate | +2.5 |
| (82) | 4-(p-methoxyphenyl)-3-buten-2-one | +3.5 |
| (83) | o-Diethoxy benzene | +3.5 |
| (84) | 4,4'-oxydianisole | +3 |
| (85) | 2,4,6-tribromoanisole | +2 |
| (86) | 2,5-dimethyl-1-phenylpyrrole | +3.5 |
| (87) | N,N'-diethylcarbanilide | +2.5 |
| (88) | Terphthalonitrile | +1.5 |
| (89) | Crotononitrile | +4 |
| (90) | Isosafrole | +5 |
| (91) | Eugenol | +4 |
| (92) | Isoeugenol | +4 |
| (93) | Anisylalcohol | +4.5 |
| (94) | 2,4-dichloroanisole | +4.5 |
| (95) | p-Tolunitrile | +3.5 |
| (96) | Ethylanisate | +4 |
| (97) | Veratrole | +4.5 |
| (98) | (p-Methoxyphenyl)acetonitrile | +4.5 |
| (99) | Thioanisole | +4 |
| (100) | 3-benzyloxybenzaldehyde | +4 |
| (101) | Triphenylphosphate | +2 |
| (102) | Santocure | +2.5 |
| (103) | p-Diethylaminobenzaldehyde | +4.5 |
| (104) | p-Dimethylaminobenzaldehyde | +2.5 |
| (105) | 4,4'-bis dimethylaminobenzophenone | +1.5 |
| (106) | 6-dimethylquinaldine | +2 |
| (107) | 7-diethylamino-4-methylcoumarin | +3 |
| (108) | N,N-diethyl-p-nitrosoaniline | +1 |
| (109) | 4,4'-methylenebis(N,N-dimethylaniline) | +2 |
| (110) | p-N,N-dimethylaminocinnamaldehyde | +1 |
| (111) | Thiuram E | +5 |
| (112) | Santicizer 1-H | +3 |
| (113) | N-t.butylacrylamide | +3 |

5th group

The following free radical precursors were combined with the following stable free radicals in the formulation described, and were coated, imaged, and toner developed as described earlier to give excellent positive electrostatic copies.

(114) 3 g. triacetoneamine-N-oxide (stable free radical), 0.5 g. 2,5-dimethoxybenzaldehyde, 0.5 g. 4,4'-bis-(diethylamino)benzophenone (precursor), 0.1 g. silver lactate (promoter), 0.01% Thioflavin T (dye) in 100 g. 25% polyester (sold under the name PE 200/207 by Goodyear Tire & Rubber Company) solution in toluene/methylethylketone (75/25 ratio).

(115) 3 g. triacetoneamine-N-oxide, 0.5 g. 4,4'-bis(diethylamino) benzophenone, 0.5 g. 2,5-dimethoxybenzaldehyde, 100 g. of the 25% polyester resin solution of formulation 114.

(116) 3.0 g. triacetoneamine-N-oxide, 0.5 g. 6-dimethylaminoquinaldine (precursor), 0.5 g. 2,5-dimethoxybenzaldehyde, 100 g. of the 25% polyester resin solution of formulation 114.

(117) 3.0 g. triacetoneamine-N-oxide, 0.5 g. N-methyl-N-nitroso-p-toluenesulfonamide (precursor), 0.5 g. 2,5-dimethoxybenzaldehyde, 100 g. of the 25% polyester resin solution of formulation 114.

(118) 3.0 g. triacetoneamine-N-oxide, 0.5 g. 7-diethylamino-4-methylcoumarin (precursor), 0.5 g. 2,5-dimethoxybenzaldehyde, 100 g. 25% of the polyester resin solution of formulation 114.

(119) 3.0 g. triacetoneamine-N-oxide, 0.5 g. p,p'-benzylidene bis(N,N'-dimethylaniline) (precursor) 0.5 g. 2,5-dimethoxybenzaldehyde, 100 g. of the 25% polyester resin solution of formulation 114.

(120) 3.0 g. triacetoneamine-N-oxide, 1.0 g. carbon tetrabromide (precursor), 0.5 g. 2,5-dimethoxybenzaldehyde, 100 g. of the 25% polyester resin solution of formulation 114.

(121) 3.0 g. triacetoneamine-N-oxide, 3.0 g. chloroform (precursor), 1 g. benzophenone, 50 g. 20% Pliolite S5–D solution (Styrenebutadiene resin in toluene).

(122) 3.2 g. triacetoneamine-N-oxide, 1.0 g. iodoform (precursor), 0.2 g. benzophenone, 1.0 g. chloranil (precursor), 100 g. 40% solution Pliolite 1141A in toluene.

(123) 3.2 g. galvinoxyl (stable free radical), 1.0 g. iodoform, 0.2 g. benzophenone (promoter), 1.0 g. chloranil, 100 g. 40% solution Pliolite 1141A in toluene.

(124) 3.2 g. 2,6 - di - t.butyl-4-(3,5-di-t.butyl-4-cyclohexa-3,5-dienylideneamino) phenoxy (stable free radical), 1.0 g. iodoform, 1.0 g. chloranil, 0.2 g. benzophenone, 100 g. 40% solution Pliolite 1141A in toluene.

(125) 3.0 g. 2,2,4,4 - tetramethyl-1,2,3,4-tetrahydro-γ-carboline-3-oxyl (stable free radical), 100 g. 40% Pliolite 1141A solution in toluene, 1.0 g. iodoform, 0.2 g. benzophenone, 0.5 g. chloranil.

(126) 3.0 g. triacetoneamine-N-oxide oxime (stable free radical), 100 g. 40% Pliolite 1141A solution in toluene, 1.0 g. iodoform, 0.2 g. benzophenone, 1.0 g. chloranil.

6th group

Various resins were selected and compounded with 3 g. triacetoneamine-N-oxide, 1.0 g. iodoform, 1.0 g. Diazald-(N-methyl-N-nitroso-p-toluene sulfonamide), 1.0 g. 2,3-dimethoxybenzaldehyde, and 1.0 g. anethole to give excellent positive electrostatic prints when coated, imaged and developed in the previously described manner. Examples of these resin binders in the form of solutions in the named solvents are:

(127) Dow Styron 666 (polystyrene resin) dissolved ni toluene (20% solution).

(128) Acryloid B–82 acrylic resin dissolved in methyl ethylketone (20% solution).

(129) Butvar B–76 polyvinyl butyral dissolved in methyl ethylketone (20% solution).

(130) Pliolite 1141A styrene-butadiene resin dissolved in toluene (40% solution).

(131) 75% polyester 200/25% polyester 207 sold by Goodyear Tire & Rubber Company under the names PE 200 and PE 207 dissolved in 75% toluene-25% methyl ethylketone (25% solution).

All of the coatings in the aforesaid examples were transparent or translucent.

7th group

The examples of the 6th group, formulation 127 was repeated to demonstrate how the present invention can be used to obtain multiple copies from the orginally imaged sheet:

(132) The coated paper was imaged, charged and toned in conventional manner using the SCM liquid toner. The unfixed toner image was then transferred to a plain white sheet of paper by placing the imaged surface against the plain paper and applying pressure to the back side of the imaged sheet. Excess toner was then wiped from the original which was again charged and toned. This was repeated eight times. The last transferred image was obtained from a week old original plate and was as good as the initial image. This demonstrates the permanency of the latent image achieved in accordance with the invention.

(133) The example of 132 was repeated except that the Xerox dry toner was used in place of the liquid SCM toner to give images which were negative compared to those of Example 132.

(134) Same as Example 133 except that the APECO dry toner was used in place of the Xerox toner. In this case, a positive image was obtained.

(135) The exposed sheet of Example 132 before charging was placed in contact with a sheet of plain paper (with the coated side against the plain paper) and the two were passed through the charging and toner units of the SCM model 33 copier. In this case positive images were obtained on the side of the plan paper adjacent the exposed sheet and negative images were obtained on the side away from the exposed sheet.

I claim:

1. A photoelectric reproduction sheet, a surface of which comprises a composition consisting essentially of an electrostatically chargeable insulator binder, a stable free radical, which is stable and can be isolated and stored under normal conditions for long periods of time, and a precursor sensitive to light to produce transient free radicals, which are unstable and exist only for a fraction of a second to a few seconds and which are reactive with said stable free radical to change the conductivity of said composition, said sheet being electrostatically charged.

2. A sheet according to claim 1, said stable free radical being selected from the group consisting of organic hydrazyls, organic verdazyls, pyridinal compounds, organic nitroxides, organic aroxyls, aryl alkyls and aryl cycloalkyls in which the unpaired electron is on a carbon atom in the alkyl or cycloalkyl group and stable ion free radicals selected from the group consisting of Wurster radicals, Weitz's radicals, semiquinones, salts of polycyanoquinone dimethane and polycyanonaphthoquinone dimethane, ion radicals formed by reaction of polynuclear and heterocyclic compounds with an alkali metal, polynuclear and heterocyclic chlorates, unsubstituted and N-alkyl substituted carbozole-$C_7H_7^+BF_4^-$, triaryl nitrogen free radicals and hydrazinylium free radicals, Koelsch's radical, tanone, polyalkylthiobenzene-SbCl5, N,N'-dihydro-1,4-diazine cation, cation radical from tetra kis (dimethylamino) ethylene, stable free ion radicals from hexaalkylradialene, diphenylacetylene, dibenzocyclobutadiene, cycloheptafluorene, tetraphenylallyl, bipyrimidine, nitrobenzophenols, dinitrobenzyl, transtilbene, ninhydrin and alloxan.

3. A sheet according to claim 1, said precursor being selected from the group consisting of nitroaliphatics, paratertiary-amino aromatics, highly halogenated aliphatic, alicyclic and aromatic hydrocarbons, quinones, azo compounds, aromatic disulfides, organic silanes, halo-amides and imides, the halogens in the form of stable solid complexes, organic N-nitroso compounds, aromatic sulphon hydrazides and phototropic free radical precursors of the group selected from anthrones, tertiary amino triaryl methanes, oxidized lophines, aromatic ketones, and the anilides formed by reaction of aromatic aldehydes and aromatic amines.

4. A sheet according to claim 2, said precursor being selected from the group consisting of nitroaliphatics, para-tertiary-amino aromatics, highly halogenated aliphatic, alicyclic and aromatic hydrocarbons, quinones, azo compounds, aromatic disulfides, organic silanes, halo-amides and imides, the halogens in the form of stable solid complexes, organic N-nitroso compounds, aromatic sulphone hydrazides and phototropic free radical precursors of the group selected from anthrones, tertiary amino triaryl methanes, oxidized lophines, aromatic ketones, and the anilides formed by reaction of aromatic aldehydes and aromatic amines.

5. A photoelectrostatic method of imaging comprising (1) exposing to light a sheet, at least one surface of which comprises a composition consisting essentially of a stable free radical, which is stable and can be isolated and stored for long periods of time, and a precursor sensitive to light to be converted to transient free radicals which are unstable and which exist only for a fraction of a second to a few seconds and which are reactive with said stable free radical to change the conductivity thereof, and a plastic binder having an electrical resistance not substantially less than $10^9$ ohms per square, (2) charging said sheet either before or after said exposure step and (3) developing the charged and exposed sheet with toner particles to form a toner-developed image.

6. A method according to claim 5, including transferring the toner-developed image to another sheet.

7. A method according to claim 5, wherein before carrying out said charging and developing steps, another sheet is placed adjacent to the imaged surface of said imaged sheet and the two sheets are subjected to said charging and developing steps together to image said other sheet on both sides, one side being a positive image and the other side being a negative image.

References Cited

UNITED STATES PATENTS

| | | | |
|---|---|---|---|
| 3,046,209 | 7/1962 | Sprague | 96—90 |
| 3,114,635 | 12/1963 | Fidelman | 96—89 |
| 3,056,673 | 10/1962 | Wainer | 96—90 |
| 3,042,519 | 7/1962 | Wainer | 96—90 |
| 3,046,125 | 7/1962 | Wainer | 96—90 |
| 3,081,165 | 3/1963 | Eher | 96—1 |
| 2,845,348 | 7/1958 | Hallman | 96—1 |

OTHER REFERENCES

Hunig, "Stable Radical Ions" Chemical & Engineering News, Oct. 31, 1966, pp. 102–3.

GEORGE F. LESMES, Primary Examiner

J. P. BRAMMER, Assistant Examiner

U.S. Cl. X.R.

96—1, 88, 90; 117—37; 252—501